3,257,081
RECOVERY OF WASTE GRINDING MATERIALS
Wilbur F. Brown, Glenn C. Mook, and Joseph J. Jarosi, Toledo, and Eugene H. Cunningham, Walbridge, Ohio, assignors to Libbey-Owens-Ford Glass Company, Toledo, Ohio, a corporation of Ohio
Filed May 21, 1962, Ser. No. 196,203
10 Claims. (Cl. 241—25)

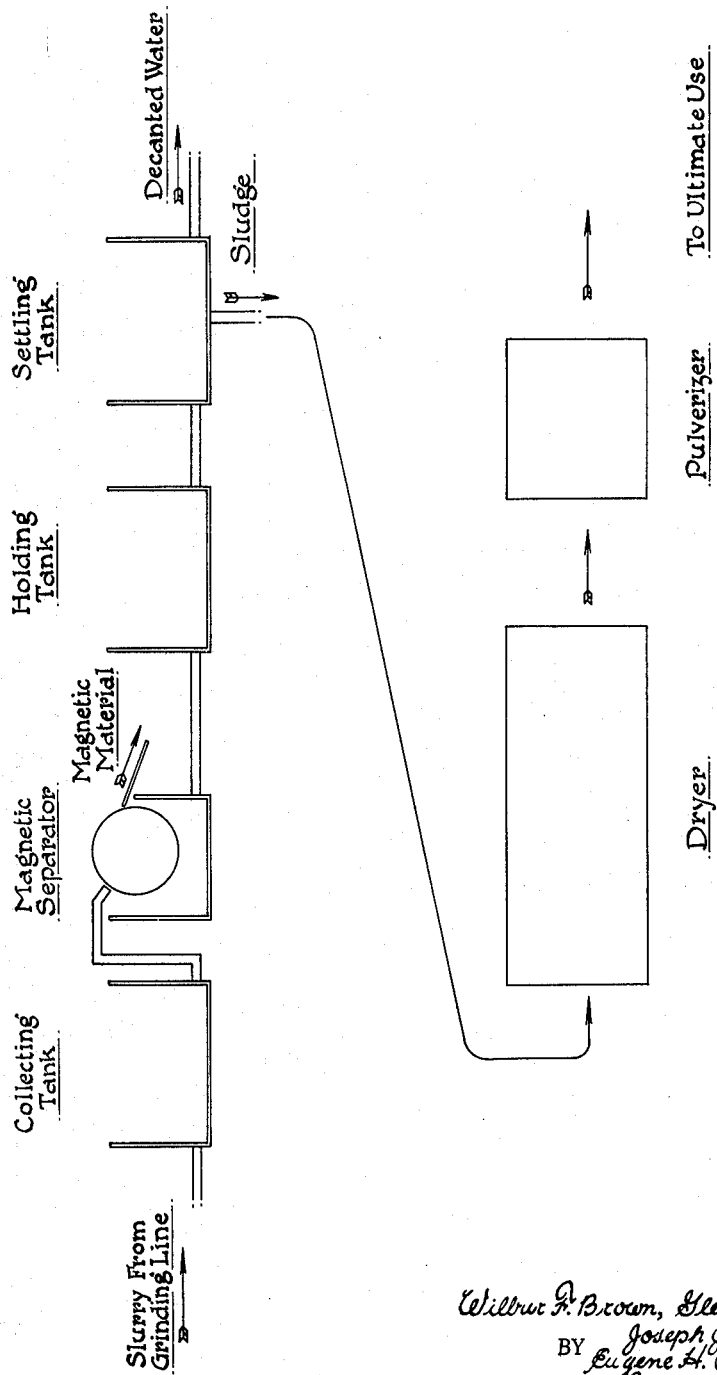

The present invention relates broadly to processes for treating a slurry of pulverulent materials suspended in a liquid medium. More particularly, it pertains to processes for recovering the extremely finely divided and intimately associated mixture of pulverized sand and glass particles obtained as a waste product in the grinding or surfacing of plate glass.

Present day sheet glass and plate glass are generally made by charging into one end of a continuous melting tank a glass batch comprised primarily of sand, lime and soda ash, along with lesser amounts of minor ingredients to impart various desired characteristics to the finished glass. A certain amount of cullet, or broken glass, is also charged into the furnace along with the batch materials, either intimately admixed therewith or separately as in a layer or blanket upon which the batch materials are supported for movement into the melting area of the tank, and the molten glass then flows successively through melting (refining and conditioning areas into the working area where a sheet or plate is continuously drawn or rolled therefrom.

In the production of plate glass, the relatively viscous molten glass is withdrawn from the working end of the melting tank between a pair of counter-rotating forming rolls which reduce the glass to a continuous rough blank or ribbon of predetermined width and thickness. Due to the nature of its manufacture, the sheet or ribbon has relatively rough or irregular surfaces. In order to smooth the surfaces as well as to provide parallelism therebetween, the sheet is subjected to a surfacing or grinding operation with an abrasive material such as ordinary sand. The abrasive material is usually fed onto the glass sheet as a slurry where it is utilized by a series of grinding runners, generally of cast iron, as a grinding medium to wear away irregularities in the surface of the sheet.

During the course of the grinding operation, the sand particles are gradually worn down and as they are thus worn down, the particles are reclassified and used at subsequent stages in the grinding process where the sheet approaches its final smoothness until such time as they become so small as to be no longer effective in grinding. The spent grinding slurry, which also contains extremely fine particles of glass eroded from the sheet and fragments of iron abraded from the grinding runners in addition to the particles of sand, has heretofore been discarded as being of no value and, in fact, disposal of the material has constituted a major problem due to the large quantities involved.

Various uses for the material have been proposed, one of the most important of which has been as constituent in the batch materials for making additional glass. However, due to its extremely small particle size, which averages in the neighborhood of from two to five microns, the material has been difficult to collect in a usable form on an economic basis.

It is therefore an object of the present invention to provide a process for recovering, in a commercial usable form, the finely divided particles of sand and glass resulting as a waste product in the grinding of plate glass.

Another object of the present invention is to provide a process of rapidly settling the suspended solids in the slurry used in grinding plate glass.

Other objects and advantages of the invention will become more apparent during the course of the following description when taken in connection with the accompanying drawing.

In the accompanying single figure, there is shown schematically a preferred system for carrying out the present invention.

According to the present invention as will be evident in the accompanying drawing, waste grinding slurry is collected from one or more discharge points in the grinding system and treated to remove any impurities, such as iron, which may be objectionable in the ultimate use of the recovered product. After purification, the slurry is transferred to a settling tank where predetermined quantities of flocculating agents are added and rapidly dispersed through the slurry. Thereafter, a floc is formed which causes the suspended solids to settle, leaving relatively clear water overhead which is decanted or drawn off. The settled material, or sludge, is then dewatered to a predetermined moisture content, or even completely dried, to become a frangible, easily crushed cake. Depending upon the ultimate use to which the recovered material is to be put, the cake may thereafter be crushed to break down the agglomerated material to a desired particle size which, in the case of a glass batch constituent, is generally the original size of the sand and glass particles.

In a conventional plate glass grinding system, as earlier described, the sand, glass and metallic particles are periodically classified as they become worn down and are thereafter employed at subsequent stages in the grinding process. The spent particles are normally discarded from the grinding system at two or more points during their recirculation through the system, one principal point generally being the overflow at the fine end of the grader, where the particles which are too small to again go through the grading or classifying system for further use in grinding are discharged, and another principal point being the outflow from the last few grinding heads in the line, where practically all of the particles are so small as to be of no further use in grinding so that they are not recirculated through the grading system but are discharged directly from the grinding heads.

According to the present invention, slurry from these discharge points in the grinding system is diverted into a collecting tank where it is continuously, but gently, agitated to prevent the heavier particles from dropping out of suspension. These heavier particles tend to form a dense sediment in the bottom of the container if the slurry is not constantly agitated, while some of the smaller particles, which are almost colloidal in size, will remain in suspension indefinitely. If left undisturbed for several hours, the sediment has been found to solidify so as to be almost impossible to disperse and put back into suspension. A mechanical stirrer or mixer is therefore preferably employed in the collecting tank to agitate the slurry and maintain all of the solids in suspension.

Where the recovered material is to be employed as a batch constituent in the production of additional glass, it may be necessary to first remove a portion, if not all, of the iron abraded from the grinding runners, as well as any magnetic material originally present in the grinding sand. A certain amount of iron can be tolerated in the batch constituents without causing excessive discoloration of the finished glass, the amount permissible depending upon the particular type of glass being made; for example, the so-called heat absorbing glasses having a considerably higher iron content than does regular glass. In any event, where the recovered materials are to be used in making glass, it is only necessary that the iron be removed to the extent necessary to insure that the amount of iron in the finished glass will be within acceptable limitations. Of course, for some ultimate uses, abraded iron in the recovered material is not objectionable and the purification step can then be entirely eliminated.

There are several ways in which the abraded iron can be removed from the grinding slurry, the more common being by magnetic separation, chemical digestion, flotation, or by combinations thereof. The particular method chosen will be determined by a number of factors including the degree of purification required, cost, and the quantity of material to be treated. We preferably pass the slurry from the collecting tank over a rotating-drum type magnetic separator in a relatively thin laminal flow, wherein the particles of magnetic material in the slurry are attracted to the drum by a magnetic field induced in a sector thereof. The purified slurry, after having the magnetic particles removed by passing over the drum, is directed into a holding tank similar in size and construction to the aforementioned collecting tank. The magnetic particles attracted to the drum are carried by the rotation of the drum around beyond its magnetized sector where they are either collected for salvage or discharged as waste. It has been found that an additional amount of magnetic material can be removed by recirculating the slurry through the magnetic separator one or more times, the amount of magnetic material recovered on each subsequent pass over the magnetic drum being, of course, substantially reduced over the preceding pass.

The magnetic field may be induced in the magnetized sector of the rotating drum by magnets of either the permanent or electromagnetic type. Although the permanent magnets require much less maintenance and are considerably less expensive to operate than electromagnets, the electromagnets have an advantage in that their field intensity can be increased or decreased to suit the characteristics of the slurry, and they can also potentially provide a stronger field than the permanent magnets. Thus, the field intensity can be increased to a maximum to attract the weakly magnetic particles where the collected material must exhibit a high degree of purity.

A certain amount of the iron in the slurry will be so weakly magnetic as to not be removed by passage over the drum of the magnetic separator, and a small amount may even be completely nonmagnetic. Where desirable, some of the weakly magnetic material can be recovered by passing the partially de-ironed slurry through a conventional magnetic filter wherein the particles come in direct contact with the filter elements, which have a relatively strong magnetic field induced therein, and adhere to the filter elements while the remainder of the slurry, including the sand and glass particles, passes through. The elements in the magnetic filter are then periodically cleansed of the collected material.

In the conventional drum type magnetic separator, the magnetic particles in the slurry are separated from the source of the magnetic field by the thickness of the nonmagnetic drum, and hence the intensity of the attracting force on the particles is somewhat less than in the magnetic filter. As with the magnetic separator, it has been found that additional magnetic material may be recovered by recirculating the slurry through the filter a number of times. It will be obvious, of course, that for efficient operation, instead of recirculating the slurry through a single magnetic separator or filter, it may be passed through a plurality of such machines connected in series to obtain the same effect.

In actual practice, one passage through the magnetic separator has been found to remove approximately one-third of the iron from the slurry, and a single passage of the thus treated slurry through a magnetic filter removes approximately an additional one-third of the original iron. Where further purification is required, the slurry can be recirculated as above described or treated chemically or by a flotation process. In certain instances, it may even be desirable to dispense with the magnetic treatment entirely and employ flotation or chemical treatment as the sole means of removing the iron.

Following removal of the iron, the slurry is treated to cause the remaining suspended particles of sand and glass to settle at a relatively rapid rate. Although some of the larger suspended particles will settle after an extended period of time without additional treatment of the slurry, the particles thus settled form a tough, hard deposit which is difficult to handle. Furthermore, even after a period of several days, or even weeks, the smaller particles remain in suspension and thus it is not possible to reuse the water or discharge it directly to a stream.

Therefore, according to a preferred embodiment of the present invention the de-ironed or purified slurry is transferred from the holding tank into a settling tank generally having a means for stirring the slurry to maintain the minute particles in suspension until one or more flocculants have been dispersed therethrough in a manner to be hereinafter more fully described.

It has been discovered that addition to the slurry of a small amount of a synthetic, organic, high-molecular weight polyacrylamide or the anionic or cationic copolymer thereof, sold under the trade name "Separan" by the Dow Chemical Company of Midland, Michigan, along with the salt of a di-valent or tri-valent metal, will cause extremely rapid settling of the suspended solids therein and result in overhead water having a relatively high degree of clarity. The clarified water can thus be drawn off and reused or discharged directly to a stream without fear of pollution. It has also been found that a number of the salts of di-valent or tri-valent metals will by themselves, when added to the slurry in sufficient quantities, ultimately cause settling of at least a majority of the suspended solids. Distributing these salts through the slurry and allowing them to react causes the formation of a gelatinous floc which carries the particles downwardly out of suspension to create a sludge in the bottom of the container with the salt, of course, becoming a part of the sludge.

The polyacrylamide and its anionic and cationic copolymers have also been found to cause limited settling of the suspended solids in the slurry if used in such relatively large quantities as to be economically unfeasible. Use of the polyacrylamide or its anionic or cationic copolymer in combination with the salt of a di-valent or tri-valent metal, however, materially reduces the amount required of both the polyacrylamide and the metallic salt, while at the same time improving the settling efficiency and increasing the settling rate.

Although for some ultimate uses of the recovered product the particular metallic salt chosen is immaterial, for other ultimate uses the metallic salt must be selected, or at least limited in quantity, so as not to be incompatible with the ultimate use. Thus, certain salts of magnesium and calcium have been found particularly well adapted for use in the present process where the recovered material is to be used as a glass batch constituent. These salts of magnesium and calcium are not incompatible with glass batch materials and, in fact, where the recovered materials are to be so used, the amounts of certain other constituents of the batch, which also contain magnesium and calcium, can be adjusted to compensate for the presence of the metallic salt in the recovered materials.

In particular, the oxides, hydroxides and chlorides of calcium and magnesium have been found to form a floc adequate to cause settling of a majority of the suspended solids after a relatively short period of time if used alone, and when used in combination with polyacrylamide or the anionic or cationic copolymers thereof, these same materials will cause extremely rapid settling of substantially all of the suspended solids. The rate of settling and degree of clarity of the resulting overhead water where one of these metallic salts is employed alone will vary according to the amount of the salt used, with the degree of clarity ranging from cloudy when a small amount is used to relatively clear when several hundred parts per million of the metallic salt are added.

In using the salts of di-valent or tri-valent metals in combination with the polyacrylamide, the amount of the reagents required will again be determined by the efficiency and rate of settling desired. An inverse relationship exists between the amount of metallic salt and the amount of polyacrylamide or its anionic or cationic copolymers required when so combined; that is, as the amount of polyacrylamide is increased, the amount of metallic salt can be decreased within limits, or vice versa, while still obtaining comparable results in terms of settling rate and efficiency.

Thus, according to the present invention, after the slurry has been transferred from the holding tank into the settling tank, a liquid solution of the metallic salt is added and the slurry is stirred by means of a mixer within the settling tank to distribute the metallic salt uniformly therethrough. We generally employ calcium chloride in the amount of at least 40 parts per million, and preferably about 400 parts per million, as the metallic salt since it is inexpensive and readily available, although as stated earlier comparable amounts of other hydrolizable reagents such as magnesium chloride and the oxides and hydroxides of magnesium and calcium perform very satisfactorily. Thereafter, a liquid solution of polyacrylamide or its anionic or cationic copolymers is distributed through the slurry, preferably in the amount of about 20 parts per million although the actual amount will be determined by factors such as the desired rate of settling, degree of clarity of the overhead water, and amount of metallic salt employed, and may vary from zero up to 30 parts per million of the slurry or more. Immediately upon distribution of the polyacrylamide through the slurry, stirring is discontinued and a heavy gelatinous precipitate forms, which begins to settle almost immediately, carrying the suspended solids downwardly with it. Within a very short period of time, substantially all of the suspended solids settle to the bottom of the tank to form a sludge, leaving the water thereabove substantially clear.

After the solids have settled to the bottom of the tank, or even during the settling period after initial settling has occurred, the clear water is decanted, or drawn off, from above the settled sludge in a conventional manner. The sludge remaining in the bottom of the settling tank after the water has been drawn off contains about 50 percent water and therefore must generally be further dried to be in condition for its ultimate use. Due to its water content, the sludge is in the nature of a viscous liquid so that it can be discharged through an opening in the bottom of the tank into a trough by means of which it is carried to the dewatering or drying process. It will be understood, of course, that in commercial practice processes of this type are often continuous, and it is anticipated that the flocculation and recovery of the settled material according to the instant invention may be carried on as a continuous process.

It is contemplated that the wet sludge may be dewatered in a number of ways, for example by centrifuging, filtering, air drying or by combinations thereof, the particular method chosen depending to a certain extent upon the degree of drying required and the ultimate use to which the material is to be put. Excellent results have been obtained in lowering the water content of the recovered material to any desired level, and even completely drying it, by heating the material for an extended period of time under controlled atmospheric conditions. The wet grader waste, or sludge, is preferably passed through a continuous furnace in a relatively shallow layer where it is heated for a period of time sufficient to drive off the excess water. Where the recovered material is to be used in its original finely divided form as a glass batch constituent, the temperature in the furnace is maintained somewhat below that at which the glass particles would tend to soften and unite the sand and glass particles into a cohesive mass. Thus, it has been found that the furnace temperature may be as high as 800° Fahrenheit or more without causing this softening of the glass particles.

The sludge which, as above described, contains approximately 50 percent water when it enters the drying furnace, remains within the furnace for a period sufficient to reduce the moisture content to the desired level. Although samples of grinding slurry dried by heating normally produce a hard precipitate resembling a shale, the caked material recovered according to the present process is very friable and can, where desired, be crushed with little effort. For certain uses, of course, the dewatered material may be left in its caked form or crushed to a desired lump size. However, where use as a glass batch constituent is contemplated, the caked or agglomerated material is preferably reduced to its original particle size or to an agglomerated size somewhat thereabove in conventional crushing equipment, and thereafter either fed directly into the glass batch mixing system or placed in bags for convenience in storing and handling.

For certain other uses of the recovered materials, for example, as an aggregate in the making of concrete or building blocks, the sludge may be dewatered at a temperature slightly above the softening point of the glass particles, in which case the sand and glass particles will tend to sinter and form a porous, coherent mass. The sintered material is then crushed in a conventional manner to create aggregate of the desired size.

Reviewing briefly the process of the present invention, waste slurry from the grinding line is collected in a tank and treated, either magnetically, chemically or by flotation, to remove part or all of the iron present in the slurry, primarily that iron abraded from the grinding runners. The purified slurry is then transferred to another tank where small amounts of reagents are added to cause flocculation and a subsequent rapid settling of the suspended solids therein. After the solids have settled, the clear liquid is decanted from the tank and the wet sludge remaining in the bottom is dewatered to reduce its moisture content to a predetermined level. The dewatered sludge, or cake, may then be crushed to the desired size to be in condition for its ultimate use.

It is believed apparent that the process herein disclosed is of particular value in the treatment of waste materials from the grinding of plate glass, wherein the water can be recovered for additional use, the iron abraded from the grinding runners can be salvaged, and the sand and glass particles may be employed as raw materials in the making of additional glass. Thus, the process makes possible a substantial and important reduction in the cost of production of plate glass.

It is to be understood that the forms of the invention herewith described are to be taken as illustrative embodiments only of the same, and that various procedural changes may be resorted to without departing from the spirit of the invention.

We claim:

1. A process for recovering waste materials from the slurry of sand and water used in the grinding of plate glass with metallic runners, including the steps of collecting the slurry from the glass grinding operation, removing from said slurry at least part of the metallic particles abraded from said runners during grinding, adding flocculants to said slurry after the removal of said metallic particles to cause the remaining suspended particles to rapidly drop out of suspension and form a sludge, decanting the clarified water from above said sludge and dewatering the sludge to a predetermined moisture content.

2. A process for recovering waste materials from the grinding of plate glass as claimed in claim 1, wherein the metallic particles are removed from the slurry magnetically.

3. A process for recovering waste materials from the grinding of plate glass as claimed in claim 1, wherein said flocculants comprise a compound chosen from the group consisting of the salts of di-valent and tri-valent metals.

4. A process for recovering waste materials from the grinding of plate glass as claimed in claim 1, wherein said flocculants comprise at least one compound chosen from the group consisting of the salts of di-valent and tri-valent metals and an organic material chosen from the group consisting of polyacrylamide and its anionic and cationic copolymers.

5. A process for recovering waste materials from the grinding of plate glass as claimed in claim 1, wherein said flocculants include at least one compound chosen from the group consisting of the oxides, hydroxides and chlorides of calcium and magnesium and an organic material chosen from the group consisting of polyacrylamide and its anionic and cationic copolymers.

6. A process for recovering waste materials from the grinding of plate glass as claimed in claim 5, wherein said flocculants comprise about 400 million parts per million of calcium chloride and about 20 parts per million of polyacrylamide.

7. A process for collecting the suspended solids in waste slurry resulting from the grinding of plate glass, including dispersing through the slurry at least 40 parts per million of a metallic salt chosen from the group consisting of the oxides, hydroxides and chlorides of calcium and magnesium and up to 30 parts per million of an organic material chosen from the group consisting of polyacrylamide and its anionic and cationic copolymers, allowing said metallic salt and organic material to form a floc whereby the solids are carried downwardly out of suspension to form a sludge, decanting the clarified water from above said sludge, and dewatering said sludge to a predetermined moisture content.

8. A process for collecting the suspended solids in waste slurry resulting from the grinding of plate glass as claimed in claim 7, wherein said sludge is dewatered by being heated to a temperature below the softening point of the sand and glass particles therein to drive off the remaining water from said sludge and to thereby form a friable cake.

9. A process for collecting the suspended solids in waste slurry resulting from the grinding of plate glass as claimed in claim 8, wherein said sludge is heated to a temperature of about 800° Fahrenheit.

10. A process for collecting the suspended solids in waste slurry resulting from the grinding of plate glass as claimed in claim 8, including crushing the dried cake to reduce the agglomerated particles therein to their original grain size.

References Cited by the Examiner
UNITED STATES PATENTS

| | | | |
|---|---|---|---|
| 2,276,075 | 3/1942 | Wuensch. | |
| 2,288,179 | 6/1942 | Breerwood | 241—24 |
| 2,604,207 | 7/1952 | Scott | 210—233 X |
| 2,668,144 | 2/1954 | Joos | 210—53 |
| 2,922,585 | 1/1960 | Searfoss | 241—24 |
| 2,941,942 | 6/1960 | Dahlstrom et al. | 210—53 |
| 3,066,095 | 11/1962 | Hronas | 210—53 |
| 3,067,133 | 12/1962 | Conley et al. | 210—53 |
| 3,087,890 | 4/1963 | Pye | 210—53 |

OTHER REFERENCES

"Handbook of Mineral Dressing" by A. F. Taggart, Wiley and Sons, copyright 1945 (pp. 15–07 through 15–09).

ROBERT C. RIORDON, *Primary Examiner.*

J. SPENCER OVERHOLSER, *Examiner.*

H. F. PEPPER, *Assistant Examiner.*